US008458655B1

(12) United States Patent
Linebarger et al.

(10) Patent No.: US 8,458,655 B1
(45) Date of Patent: Jun. 4, 2013

(54) IMPLICIT RESET

(75) Inventors: Darel Allen Linebarger, Southborough, MA (US); Matthew Englehart, Olmsted Township, OH (US); Peter Szpak, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 566 days.

(21) Appl. No.: 12/276,974

(22) Filed: Nov. 24, 2008

Related U.S. Application Data

(63) Continuation-in-part of application No. 10/759,346, filed on Jan. 15, 2004, and a continuation-in-part of application No. 11/890,018, filed on Aug. 3, 2007, which is a continuation of application No. 11/170,305, filed on Jun. 28, 2005.

(51) Int. Cl.
*G06F 9/44* (2006.01)

(52) U.S. Cl.
USPC ............................. 717/113; 717/105; 717/109

(58) Field of Classification Search
USPC .......................................... 717/105, 109, 113
See application file for complete search history.

(56) References Cited

U.S. PATENT DOCUMENTS

| 5,286,907 A | 2/1994 | Okamura et al. |
| 5,465,240 A | 11/1995 | Mankovitz |
| 5,497,500 A | 3/1996 | Rogers et al. |
| 5,635,657 A | 6/1997 | Lee et al. |
| 5,821,934 A * | 10/1998 | Kodosky et al. ............... 715/763 |
| 5,850,548 A | 12/1998 | Williams |
| 5,902,115 A | 5/1999 | Katayama |
| 5,980,262 A | 11/1999 | Tseng et al. |
| 6,117,626 A | 9/2000 | Yamane et al. |
| 6,338,143 B1 | 1/2002 | Shimazaki |
| 6,490,715 B1 | 12/2002 | Moriwaki et al. |

(Continued)

FOREIGN PATENT DOCUMENTS

| CN | 1275035 | 11/2000 |
| EP | 0242131 B1 | 3/1995 |

(Continued)

OTHER PUBLICATIONS

Gheorghiu et al., "Model of a Supercharged Diesel Engine with High and Low-Pressure EGR as Part of an NMPC for ECU Implementation," SAE 2007-24-0084; 2007; 18pg.*

(Continued)

*Primary Examiner* — Li B Zhen
*Assistant Examiner* — Ryan Coyer
(74) *Attorney, Agent, or Firm* — Nelson Mullins Riley & Scarborough LLP

(57) ABSTRACT

In an embodiment, one or more computer readable media are provided. The media store executable instructions that when executed by processing logic implicitly change the value of a state in a graphical model while the model executes. The media store one or more instructions for identifying a context that includes a first block having a state and for executing the context when the state has a first value, the executing storing an intermediate result. The media store one or more instructions for changing, implicitly, the state from the first value to a second value based on a user input, where the changing occurs while the context is executing, or while the context is paused. The media store one or more instructions for executing the context when the state has the second value.

22 Claims, 13 Drawing Sheets

U.S. PATENT DOCUMENTS

| | | | |
|---|---|---|---|
| 6,526,566 B1 | 2/2003 | Austin | |
| 6,802,053 B1 | 10/2004 | Dye et al. | |
| 6,961,913 B1 | 11/2005 | Okazaki et al. | |
| 7,024,660 B2 | 4/2006 | Andrade et al. | |
| 7,299,383 B2* | 11/2007 | David et al. | 714/51 |
| 7,299,458 B2* | 11/2007 | Hammes | 717/133 |
| 7,370,293 B2 | 5/2008 | Yamagata | |
| 7,487,418 B2* | 2/2009 | Kayukawa et al. | 714/727 |
| 7,490,341 B2* | 2/2009 | Kiiskinen et al. | 725/38 |
| 7,774,728 B2 | 8/2010 | Frenkil | |
| 2002/0034306 A1 | 3/2002 | Owada et al. | |
| 2002/0077800 A1* | 6/2002 | Kampe | 703/21 |
| 2003/0177014 A1 | 9/2003 | Crawford et al. | |
| 2004/0102860 A1 | 5/2004 | Lai et al. | |
| 2004/0111614 A1 | 6/2004 | Yamada | |
| 2004/0144236 A1 | 7/2004 | Hiratsuka | |
| 2004/0205507 A1 | 10/2004 | Tuschner et al. | |
| 2004/0210592 A1 | 10/2004 | Ciolfi et al. | |
| 2004/0242207 A1 | 12/2004 | Chi | |
| 2005/0039162 A1 | 2/2005 | Cifra | |
| 2005/0109195 A1 | 5/2005 | Haruyama et al. | |
| 2005/0177816 A1 | 8/2005 | Kudukoli et al. | |
| 2005/0185547 A1 | 8/2005 | Nagai et al. | |
| 2005/0204317 A1 | 9/2005 | Yamagata | |
| 2005/0235253 A1 | 10/2005 | Petersen et al. | |
| 2006/0199161 A1 | 9/2006 | Huang | |
| 2006/0294369 A1 | 12/2006 | Matsushima et al. | |
| 2007/0157138 A1* | 7/2007 | Ciolfi et al. | 716/4 |
| 2008/0026355 A1 | 1/2008 | Petef | |
| 2008/0034300 A1* | 2/2008 | Shah et al. | 715/763 |
| 2008/0079591 A1 | 4/2008 | Chow | |

FOREIGN PATENT DOCUMENTS

| | | |
|---|---|---|
| GB | 2272314 | 5/1994 |
| TW | 200522740 | 7/2005 |
| TW | I261183 | 9/2006 |

OTHER PUBLICATIONS

Grunske et al., "Model-Driven Safety Evaluation with State-Event-Based Component Failure Annotations," CBSE 2005, LNCS 3489, 15pg.*

Maldonado et al., "Design and Simulation of the Fuzzification Stage through the Xilinx System Generator," Springer-Verlag, 2008, 8pg.*

Börger, Egon et al., "Modeling the Dynamics of UML State Machines," Proceedings, ASM International Workshop, Theory and Applications, vol. 1912 of LNCS, 19 pages (2000).

Buck, Joseph et al., "Heterogeneous Modeling and Simulation of Embedded Systems in El Greco," Proceedings of the Eigth International Symposium on Hardware/Software Codesign, pp. 142-146 (2000).

De Niz, Dionisio et al., "Time Weaver: A Software-Through-Models Framework for Embedded Real-Time Systems," Proceedings of the 2003 ACM SIGPLAN conference on Language, compiler, and tool support for embedded systems, vol. 38(7):133-143 (2003).

Douglass, Bruce Power, "Object Orientation with UML 2.0—Dynamic Aspects," Real Time UML, Third Edition, Addison-Wesley, Chpt. 3, pp. 139-143 (2004).

Grimshaw, Andrew S. et al., "MENTAT: An Object-Oriented Macro Data Flow System," OOPSLA '87 Proceedings, vol. 22(12):35-47 (1987).

Harel, David et al., "The Statemate Semantics of Statecharts," ACM Transactions on Software Engineering and Methodology, vol. 5(4):293-333 (1996).

The MathWorks, "Simulink® Model-Based and System-Based Design, Using Simulink, Version 5," The MathWorks, Inc., Revised for Simulink 5.1 (Release 13SP1) (2003).

Invitation to Pay Additional Fees for Application No. PCT/US2006/025238, 8 pages, dated Dec. 22, 2006.

International Search Report for Application No. PCT/US2006/025238, 8 pages, dated Aug. 1, 2007.

* cited by examiner

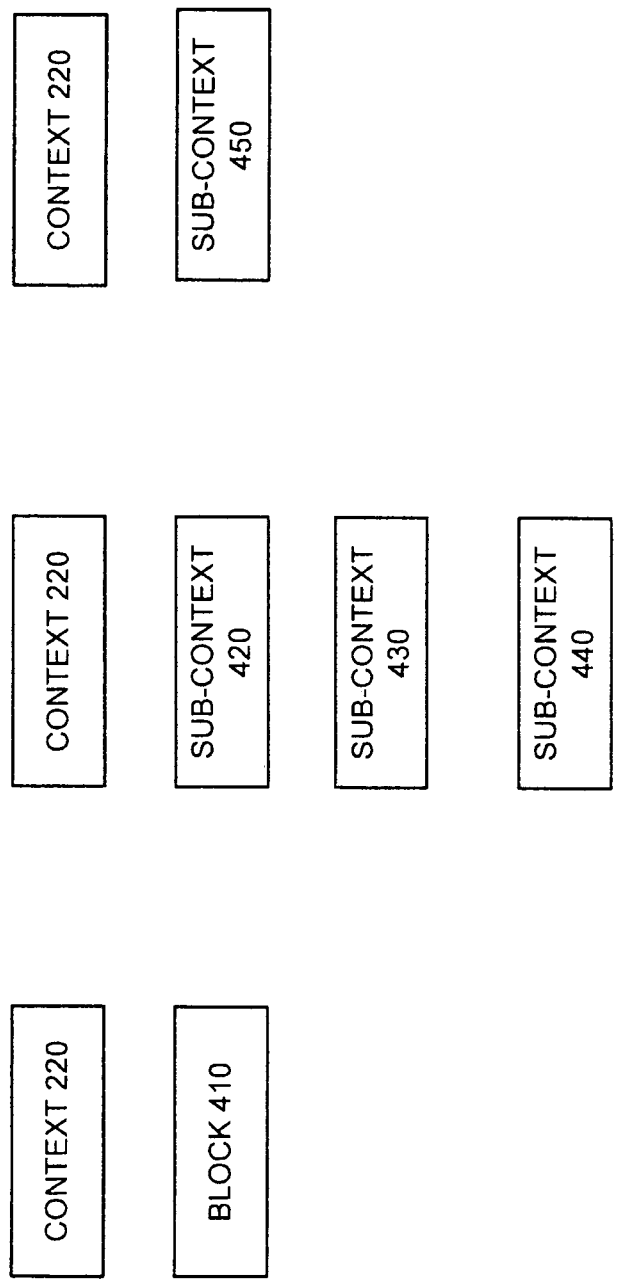

IMPLICIT RESET

RELATED APPLICATIONS

This application is a continuation-in-part of non-provisional patent application Ser. No. 11/890,018, filed Aug. 3, 2007, which is a continuation of non-provisional patent application Ser. No. 11/170,305, filed Jun. 28, 2005, and this application is a continuation-in-part of non-provisional patent application Ser. No. 10/759,346, filed Jan. 15, 2004. The contents of these applications are incorporated by reference herein.

BACKGROUND INFORMATION

Graphical models may be used to simulate types of physical systems, such as discrete systems, event-based systems, time-based systems, state-based systems, data flow-based systems, etc. These models may consist of components, such as blocks, that reference executable code for performing operations when the graphical model is executing. The blocks can vary in type and/or number and may be connected together to build large, complex models (e.g., models including hundreds or possibly thousands of interconnected blocks).

A user of a model may wish to perform certain operations in the model. For example, a user may wish to reset states for blocks having storage to an initial value. By way of example, a model may include a counter block that increments a counter every time the counter block receives an input signal value. The user may wish to reset a state for the counter block to an initial value, e.g., zero, at some point during model execution.

Current modeling applications may require that the user supply an explicit reset line from a reset block that provides a reset signal to each block that includes state, e.g., the counter block in the example. Current modeling applications may further require that the user configure the reset block via a dialog box before the state of a counter block can be reset. The user may then need to manually apply the reset signal to the explicit reset line to reset the state of a counter block.

When a model includes several blocks having state, the user may have to draw multiple reset blocks and/or many explicit reset lines so that states of the resettable blocks can be reset. These reset blocks and explicit reset lines may clutter the model thus making it difficult for a user to diagnose and/or understand the model. The use of explicit reset lines may become even more cumbersome when a model includes resettable blocks that reside in subsystems, where a subsystem represents a group of blocks sharing a relationship with each other. Resetting blocks within the subsystem may require that the user draw individual explicit reset lines from reset blocks outside the subsystem into the subsystem and then to each subsystem block that includes a state that needs resetting. This approach can clutter the subsystem and/or the model and may be prone to user error, e.g., when the user forgets to account for a resettable block in the subsystem.

SUMMARY

In an embodiment, or more computer readable media are provided. The one or more computer readable media storing executable instructions that when executed by processing logic interact with a context in a graphical model. The media store one or more instructions for associating a first block having state with a context that includes a reset input, the context implicitly resetting the state when the first block is associated with the context, the context located in the graphical model. The media store one or more instructions for executing the context, the executing storing an intermediate result in memory. The media store one or more instructions for resetting the state implicitly when a reset signal is received at the reset input while the context is executing. The media store one or more instructions for changing the state from a first value to a second value while the context executes and for executing the context when the state has the second value.

In another embodiment, one or more computer readable media are provided. The one or more computer readable media store executable instructions that when executed by processing logic implicitly change the value of a state in a graphical model while the model executes. The media store one or more instructions for identifying a context that includes a first block having a state and for executing the context when the state has a first value, the executing storing an intermediate result. The media store one or more instructions for changing, implicitly, the state from the first value to a second value based on a user input, where the changing occurs while the context is executing, or while the context is paused. The media store one or more instructions for executing the context when the state has the second value.

In still another embodiment, a device is provided. The device includes a memory to store a model that includes a context that implicitly resets the state for a block associated with the context when a signal is received at a reset input of the context, and to store a result. The device includes processing logic to execute the context and to process the signal when the signal is received at the reset input and to reset the state implicitly during the executing. The processing logic changes the state from a first value to a second value when the context is executing, and the signal is received at the reset input. The processing logic executes the context when the state has the second value, and produces the result based on the executing the context when the state has the second value.

In accordance with still another embodiment, a method for interacting with a context in a graphical model executing in a computing device is provided. The method includes associating a first block having state with a context that includes a reset input, the context implicitly resetting the state when the first block is associated with the context, the context located in the graphical model. The method includes executing the context, the executing storing an intermediate result in memory of the computing device. The method includes resetting the state implicitly when a reset signal is received at the reset input while the context is executing on the computing device. The method includes changing the state from a first value to a second value while the context executes on the computing device. The method includes executing, using the computing device, the context when the state has the second value, the executing the context when the state has the second value producing an execution result. The method includes storing the execution result in a storage device.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 4B illustrates a hierarchical representation of the block and contexts of FIG. 4A;

DETAILED DESCRIPTION

Figure 1A:
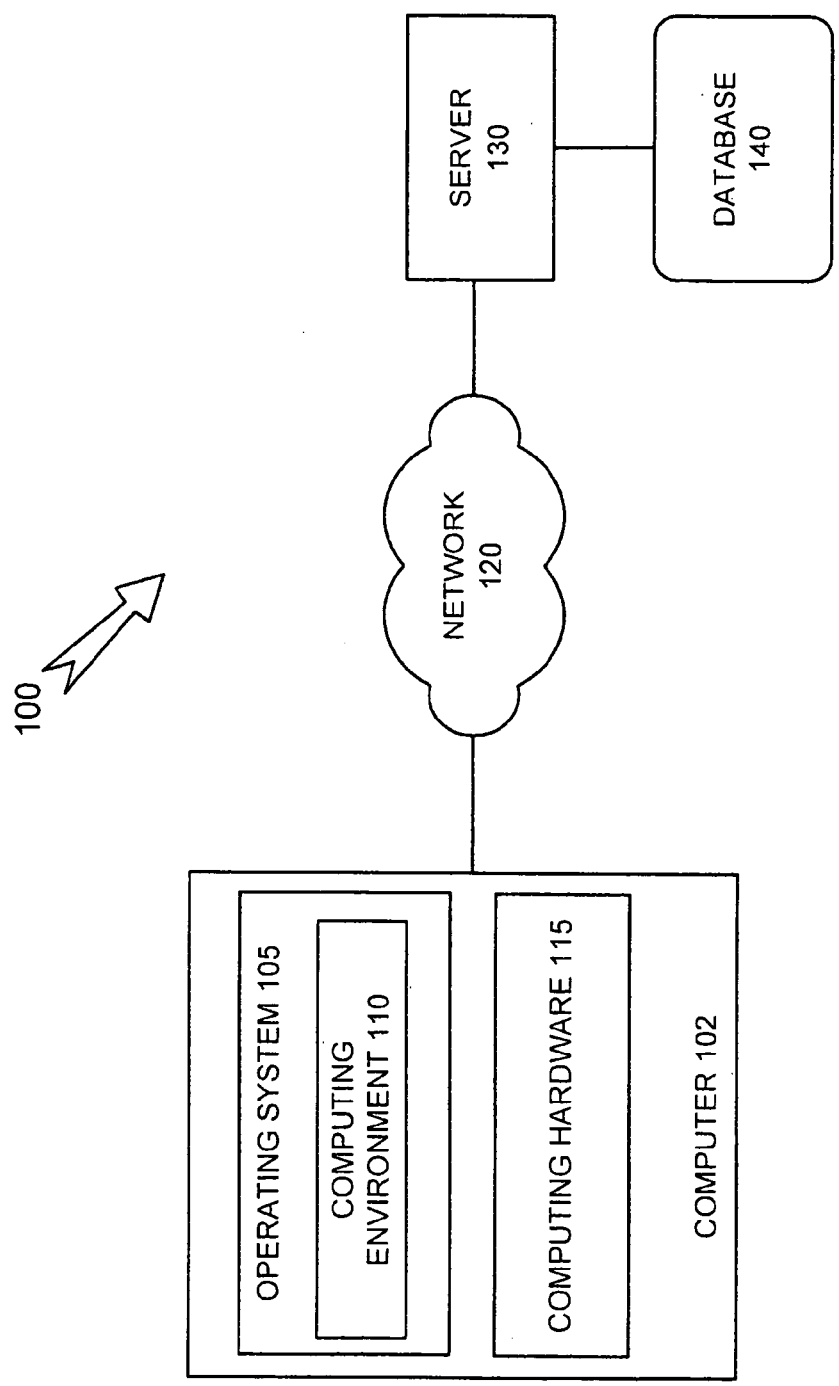
FIG. 1A illustrates an exemplary system that can be used to build or execute a model using an embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

OVERVIEW

Known techniques for resetting a state value in a graphical model may require explicit reset connections between resettable blocks, i.e., blocks having state that can be reset, and resetting logic used to reset states for the blocks. For example, these explicit reset connections may be in the form of a line connecting the resetting logic to the block. Explicit connections can clutter display areas when models become large and/or complex. These cluttered displays may make it difficult for a user to debug, revise, and/or use the graphical model because of numerous explicit reset lines in the model.

In addition to using explicit reset connections, known resetting techniques may only perform resets when a block is enabled, or started. For example, resetting a block state in an executing model may require that the model be stopped and then restarted to cause the block to read a reset value associated with the reset signal. Stopping and restarting the model may be required because the block may only read reset values when the block is enabled at model startup.

Stopping models to reset block states upon enable can increase model execution times, may make models difficult to debug, and may lead to erroneous model results. In addition, certain types of models may not work properly or may pose safety risks if model execution is stopped prematurely to reset block states in the model. For example, models of pacemakers, aircraft control systems, and/or systems for safety critical applications may result in improper operation when the models are stopped prematurely to reset block states in the models.

Exemplary embodiments described herein provide a technique for implicitly resetting states for groups of blocks that share a relationship among each other and that may be grouped into a context, where a context acts as a reference for the related blocks. In an embodiment, the context may be graphically displayed as a container, graphically identified using a border, etc.

The context may include logic, such as implicit reset logic, that allows states for blocks (referred to as block states) within the context to be reset without requiring an explicit reset connection to the context or to blocks within the context. In an embodiment, the context can be reset while a model executes.

Exemplary embodiments described herein may reduce model clutter by eliminating explicit reset connections to resettable blocks. These embodiments may further allow for faster model execution, as compared to models that employ known model resetting techniques, since these embodiments allow block states to be reset without pausing or stopping model execution. Exemplary embodiments further allow block states to be reset without first enabling or disabling a block that includes a state. Still further, exemplary embodiments may allow safety critical applications to be accurately modeled.

Exemplary embodiments may allow contexts to be arranged in hierarchies to provide a user with flexible control as to how and when various portions of a model are implicitly reset. For example, a first context may include a first block having a first state. The first context may also include a second context having a second block that includes a second block state. Here the second context may be a sub-context with respect to the first context since the second context is subsumed by the first context. In this example, the first block is at a first level of a hierarchy and the second block is at a second level of the hierarchy since the second block is located within a sub-context of the first context. When the model is executed, the first block state may be reset to a first value and the second block state may be reset to a second value. In this model, the first and second reset values can be set in parallel (i.e., at substantially the same time) or sequentially (i.e., at substantially different times) depending on how the model is configured.

Exemplary embodiments can further be configured to read reset values from external logic, such as an external storage device, an external model, a communication medium (optical fiber, wire, etc.), etc. Exemplary embodiments can also include diagnostic tools to assist a user with debugging blocks, contexts, sub-contexts, connections between blocks, reset values, etc. Exemplary embodiments can display information about implicit reset values, contexts, blocks, block states, etc., to a user, can store the information in a storage device, can send the information to a destination, etc.

Exemplary System

FIG. 1A illustrates an exemplary system 100 for practicing an embodiment. For example, system 100 may be used to construct a model that includes one or more explicitly reset blocks or contexts. System 100 may include computer 102, network 120, server 130, and database 140. The system in FIG. 1A is illustrative and other embodiments of system 100 can include fewer devices, more devices, and/or devices in configurations that differ from the configuration of FIG. 1A.

Computer 102 may include a device that performs processing operations, display operations, communication operations, etc. For example, computer 102 may include logic, such as one or more processing or storage devices, that can be used to perform and/or support processing activities on behalf of a user. Embodiments of computer 102 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results.

Computer 102 may further perform communication operations by sending data to or receiving data from another device, such as server 130. Data may refer to any type of machine-readable information having substantially any format that may be adapted for use in one or more networks and/or with one or more devices. Data may include digital information or analog information. Data may further be packetized and/or non-packetized.

Computer 102 may include operating system 105, computing environment 110, and computing hardware 115 in an embodiment. Operating system 105 may include logic that manages hardware and/or software resources associated with computer 102. For example, operating system 105 may manage tasks associated with receiving user inputs, operating computing environment 110, allocating memory, prioritizing system requests, etc. In an embodiment, operating system 105 may be a virtual operating system. Embodiments of O/S 105 may include Linux, Mac OS, Microsoft Windows, Solaris, UNIX, etc. O/S 105 may further support virtualization.

Computing environment 110 may include logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

Computing environment 110 may provide mathematical functions and/or graphical tools (e.g., for creating diagrams, plots, surfaces, images, volumetric representations, etc.). In one implementation, computing environment 110 may provide these functions and/or tools using toolboxes (e.g., toolboxes for signal processing, image processing, data plotting, parallel processing, optimization, etc.). In another implementation, computing environment 110 may provide these functions as block sets (e.g., a control system block set). In still another implementation, computing environment 110 may provide these functions in another way, such as via a library, etc.

Computing hardware 115 may include hardware based logic that executes instructions in computer 102 to perform operations, such as operations performed on behalf of a user. For example, computing hardware 115 may execute instructions to store information, generate results, display information to a user, send information to server 130 or database 140, receive information from server 130 or database 140, etc. In an embodiment, computing hardware 115 can include general purpose microprocessors and/or other types of processing logic, such as, but not limited to, field programmable gate arrays (FPGA), graphics processing units (GPUs), application specific integrated circuits (ASICs), digital signal processors (DSPs), etc.

Network 120 may include a network that transfers data (e.g., packet data or non-packet data). Implementations of network 120 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.11, Worldwide Interoperability for Microwave Access (WiMax), etc.

Network 120 may include network devices, such as routers, switches, firewalls, and/or servers (not shown). Network 120 may be a hardwired network using wired conductors and/or optical fibers and/or may be a wireless network using free-space optical, radio frequency (RF), and/or acoustic transmission paths. In one implementation, network 120 may be a substantially open public network, such as the Internet. In another implementation, network 120 may be a more restricted network, such as a corporate virtual network. Implementations of networks and/or devices operating on networks described herein are not limited to any particular data type, protocol, architecture, configuration, etc.

Server 130 may include a device capable of receiving data from, and transmitting data to, another device and/or network. For example, server 130 may include one or more server devices/computers, a workstation, mainframe, desktop computer, laptop computer, PDA, web enabled cellular telephone, smart phone, Wi-Fi device, smart sensor/actuator, or another type of device.

Implementations of server 130, and/or other devices in system 100, can include substantially any type of computing architecture/components, such as silicon-based components and/or supporting architectures, quantum-based components and/or supporting architectures, optical-based components and/or supporting architectures, etc. Exemplary embodiments of server 130 may be implemented as a standalone device, or a cluster (pool) of devices arranged in substantially any type of configuration (e.g., a computing grid). Distributed implementations of server 130 may include devices, such as load balancers, network devices, etc., to allow distributed implementations of server 130 to operate in a determined manner.

Database 140 may include logic that stores information. For example, database 140 may include storage devices that store model information on behalf of computer 102.

Figure 1B:
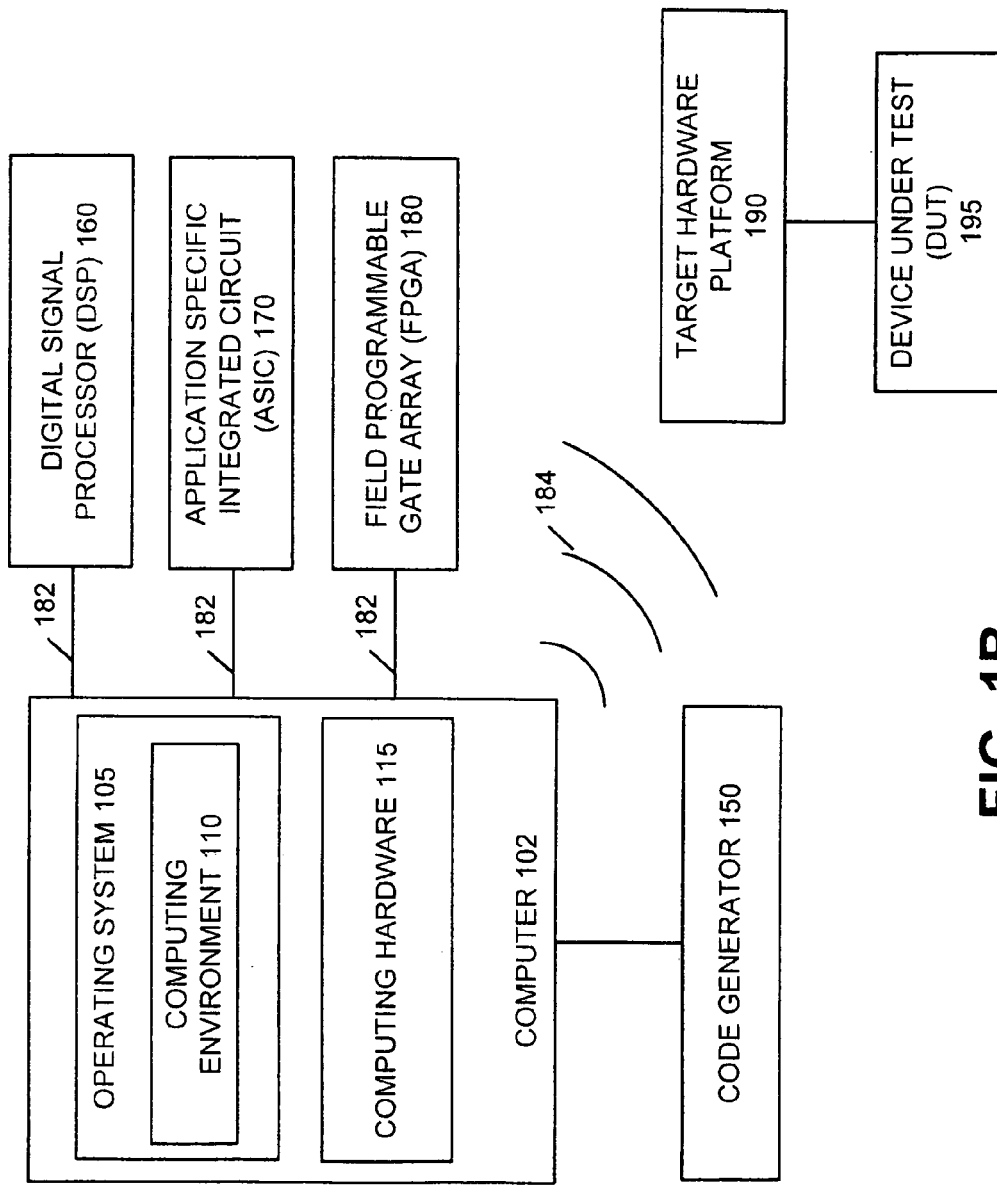
FIG. 1B illustrates an exemplary configuration that can be used to execute a model in an embodiment.

FIG. 1B illustrates an exemplary configuration that can be used to run a model in an embodiment. FIG. 1B includes computer 102, code generator 150, DSP 160, ASIC 170, FPGA 180, links 182, wireless link 184, target hardware platform 190 and device under test (DUT) 195.

Code generator 150 can include logic that generates code for a model, or a portion of a model, that is constructed using computer 102. Embodiments of code generator 150 can be internal to computer 102 or external to computer 102, e.g., as illustrated in FIG. 1B. In an embodiment, code generator 150 can generate source code, assembly language code, binary code, interface information, etc., from at least a portion of a graphical model. For example, code generator 150 can generate C, C++, Java, etc., from the graphical model. Embodiments of code generator 150 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.). Outputs from code generator 150 can include source code that can be compiled and executed on devices, such as DSP 160, ASIC 170, FPGA 180 or target hardware platform 190.

DSP 160, ASIC 170, and FPGA 180 may be devices that can execute a model. For example, DSP 160, ASIC 170, or FPGA 180 may receive source code or executable code from computer 102 via link 182, where the source code or executable code implements a model that includes blocks and/or contexts having states that can be implicitly reset. In an embodiment, links 182 may be hardwired links that transfer serial or parallel data between computer 102 and devices connected to computer 102.

Target hardware platform 190 may include a device that executes a model. For example, target hardware platform 190 may receive code for executing a model from computer 102 via wireless link 184. Target hardware platform 190 may include one or more types of processing logic that can be used to execute a model. For example, target hardware platform 190 can include a GPU, a DSP, an FPGA, and ASIC, etc., executing instructions to run a model. In an embodiment, target hardware platform 190 may receive real-time or non-real time data from DUT 195 and may process the received data using the model. Embodiments of target hardware platform 190 may include embedded systems and/or other types of systems if desired.

DUT 195 may include one or more devices that produce data that can be used by a model. For example, DUT 195 may be a controller that outputs one or more control signals that are used to control a machine, such as a turbine. Target hardware platform 190 may receive the control signals and may operate on the control signals using a model that simulates the turbine. Results produced by the model may be used to refine control algorithms implemented by the controller.

Exemplary Context

Figure 2:
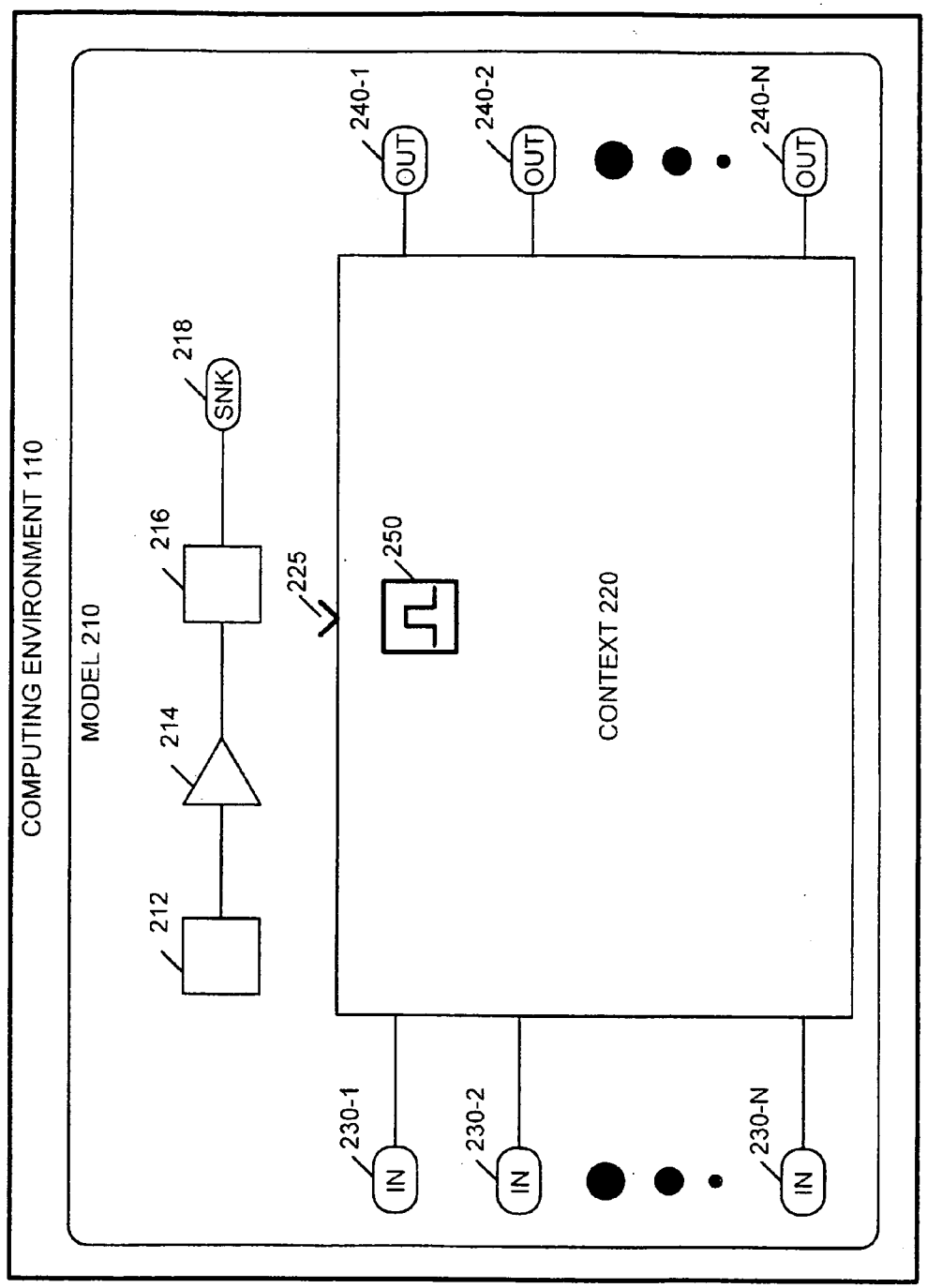
FIG. 2 illustrates an exemplary context.

FIG. 2 illustrates an exemplary context. The embodiment of FIG. 2 can include computing environment 110, model 210, and context 220. Computing environment 110 may be configured and may operate as described in connection with FIG. 1A. Model 210 may include a software application for modeling systems, e.g., physical systems, embedded systems, etc. In an embodiment, model 210 may run within computing environment 110. Embodiments of model 210 may be configured to simulate modeled systems using executable code. For example, model 210 may be used to simulate a time-based system, an event-based system, a flow-based system (e.g., data flow), a state-based system, etc.

Embodiments of model 210 may further include software tools for editing, debugging, profiling, transforming, storing, retrieving, testing, verifying, validating, etc., system models. In one implementation, model 210 may be designed in a graphical modeling application. For example, model 210 may be developed, displayed and/or executed using Simulink® software, SimBiology® software, Stateflow® software, SimEvents™ software, SimMechanics, Simscape, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; Scade from Esterel Technologies, VisSim from Visual Solutions, or aspects of a Unified Modeling Language (UML) or SysML environment.

Model 210 may include graphical representations that make up a model of a system. The graphical representations can include components, such as blocks 212, 214, 216; connections, such as lines 213, 215; dials (not shown in FIG. 2); indicators (not shown in FIG. 2); etc. In one embodiment, the graphical representations may be associated with executable instructions that perform operations when executed, where the operations are used to simulate the modeled system. For example, block 212 may represent a signal generator that generates one or more signals. Line 213 may connect block 212 to another block 214 that may represent a gain component that accepts an input signal and multiplies the input signal by a value to produce an output signal that is an amplified version of the input signal. Line 215 may connect block 214 to block 216 that may be a delay element that produces an output signal that is a delayed version of a signal input to block 216. Model 210 may further include sink 218 that may accept a signal and may send the signal to a storage device. Signals passed among blocks in model 210 may represent values and the blocks may operate on the values to produce one or more results.

Blocks used in model 210 can include state. For example, a block may represent a computation that can hold information (e.g., can store a value). This ability to store information may be referred to as having state. State for a block can change over time, such that a block may have an initial state when a model starts, an intermediate state when the model is part way through its execution, and a final state when model execution is complete. For example, block 216 may be a running mean block that produces an output signal that represents a running mean of a signal input to the block. Block 216 may store information that is useful for determining the running mean while model 210 executes.

Model 210 may further include context 220. In an embodiment, context 220 may include a graphical representation that represents a number of blocks and/or lines sharing a relationship among each other. For example, a large model of an automotive control system may include a group of blocks that represent a model of the anti-lock braking system. Since these blocks share a relationship, i.e., they are used for the braking system, they can be grouped together and represented in the model using a single graphical representation, such as a block that represents a context 220. When a user interacts with context 220, e.g., by double clicking on context 220, the user may be presented with a window that includes some or all of the blocks making up context 220 (e.g., the blocks used in the anti-lock braking system).

Context 220 may include one or more inputs 230-1 to 230-N. Context 220 may operate on the inputs and may produce one or more outputs 240-1 to 240-N. In some implementations, it may be desirable to reset states for one or more blocks in context 220. When a reset operation is desired, context 220 can be configured as a resettable context, where resetting the context is performed implicitly (i.e., without having explicit reset connection lines running to the context or to resettable blocks within the context). For example, context 220 can be labeled with reset icon 250 to indicate that one or more blocks in context 220 can be reset. Context 220 may further be configured with a reset port 225 to indicate that an implicit reset signal is associated with context 220.

Exemplary Embodiment

Figure 3A:
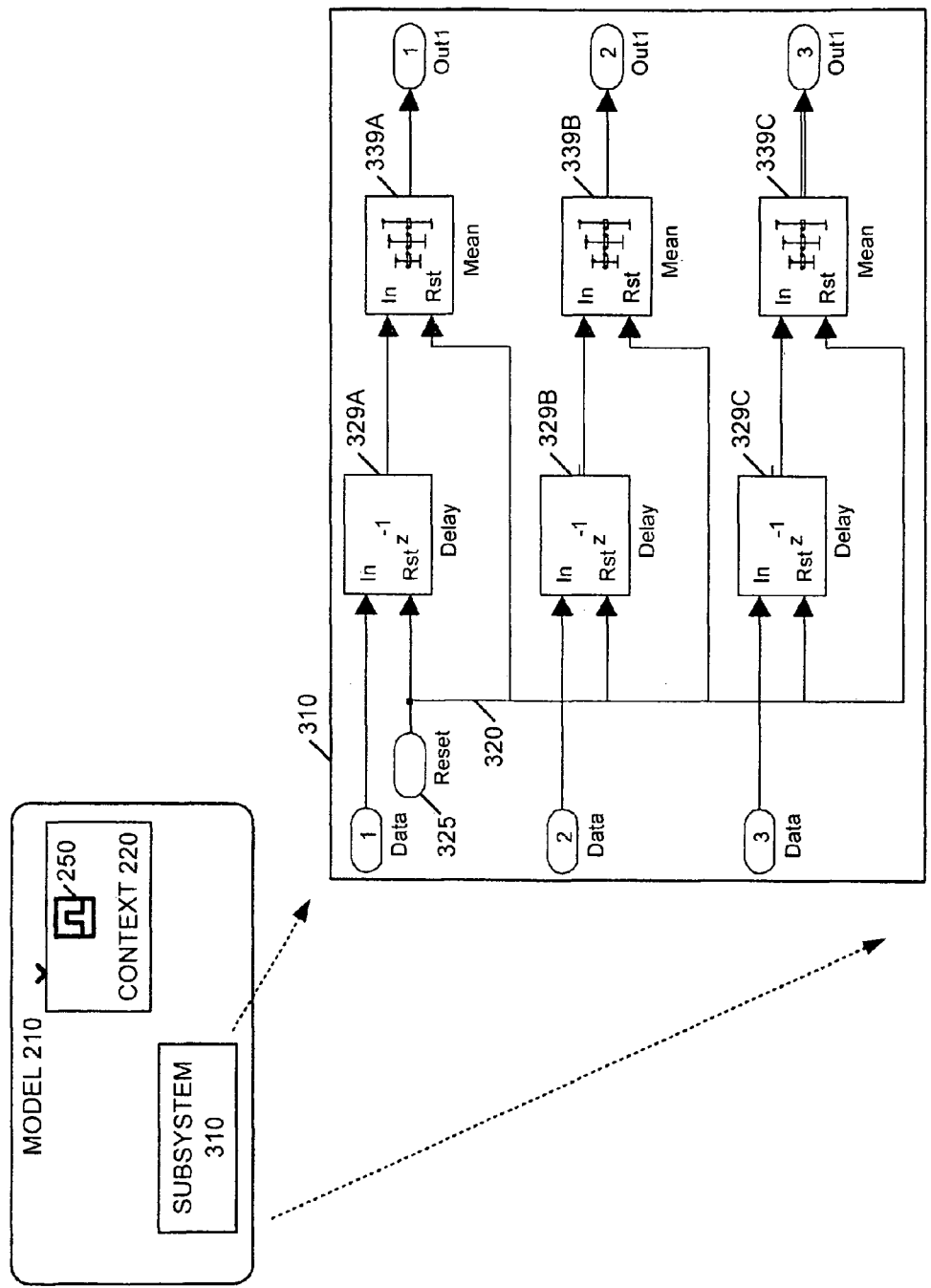
FIGS. 3A and 3B illustrate an exemplary embodiment that can include a subsystem and a context.
Figure 3B:
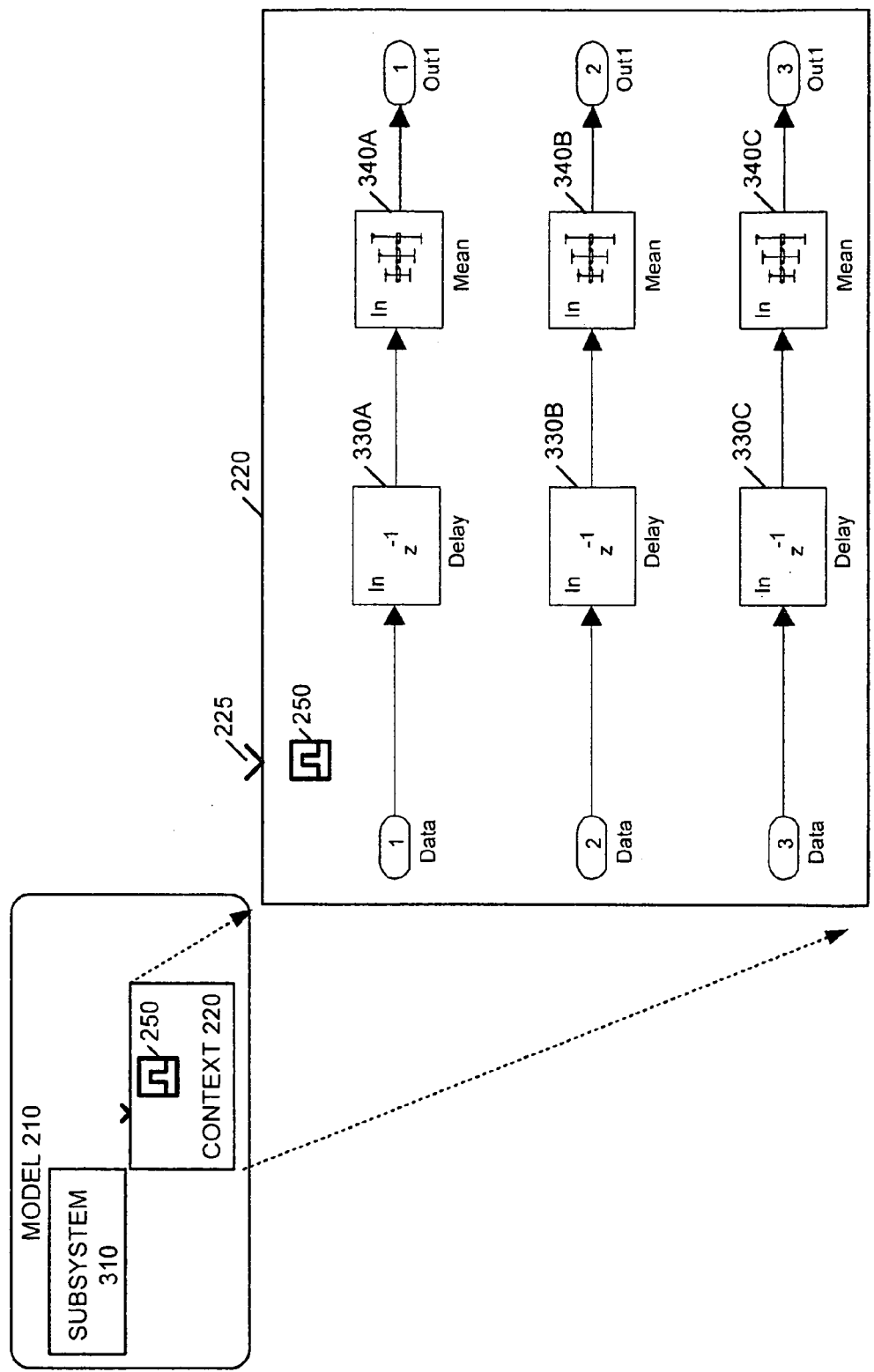

FIGS. 3A and 3B illustrate an exemplary embodiment that can include a subsystem and a context. In FIGS. 3A and 3B, model 210 can include context 220 and subsystem 310. Referring to FIG. 3A, subsystem 310 may be a conventional subsystem that can include blocks having state. These blocks may further include reset ports that allow states for blocks within subsystem 310 to be reset when the blocks are enabled. For example, blocks 329A, 329B and 329C (collectively blocks 329) may be delay blocks that can have their states reset to an initial value via explicit reset line 320. Blocks 339A, 339B, and 339C (collectively blocks 339) may represent running mean blocks whose states can also be reset via explicit reset line 320. In subsystem 310, lines may need to be drawn from a reset source 325 to reset ports on each resettable block that will be reset. In a subsystem that includes a number of blocks, these explicit reset connections can clutter the subsystem and/or model, thus making it difficult for a user to design, debug, and/or revise subsystem 310 or model 210. In some models, reset source 325 may be located outside subsystem 310. In these situations, an explicit reset connection may be drawn from reset source 325 to subsystem 310 and then to resettable blocks in subsystem 310.

Subsystem 310 may further require that block states be reset at a certain time, such as reset upon enable. When block states are reset upon enable, block output computations are suspended while the reset is performed. Then the block output computations are resumed once the reset operation is performed. Suspending, or stopping, and then resuming, or restarting, block or model execution can increase block/model execution times, especially when multiple reset events are required, and may further contribute execution errors associated with the block/model. In addition, suspending/stopping and resuming/restarting a block/model may be unacceptable in certain applications, such as real-time applications, safety critical applications, etc.

Referring now to FIG. 3B, context 220 may include reset icon 250 and one or more blocks that can include state. For example, context 220 may include delay blocks 330A, 330B, and 330C (collectively delay blocks 330) and running mean blocks 340A, 340B, and 340C (collectively mean blocks 340). In context 220, delay blocks 330 and mean blocks 340 may include states that can be implicitly reset. For example, an implicit reset signal may be provided to context 220 via reset port 225. The implicit reset signal may be used to reset blocks 330 and 340 during model execution, i.e., without requiring that model 210 be paused during execution. Context 220 may provide a user with a display that is less cluttered as compared to subsystem 310 since explicit reset lines are not required in FIG. 3B.

Exemplary Context Hierarchy

Figure 4A:
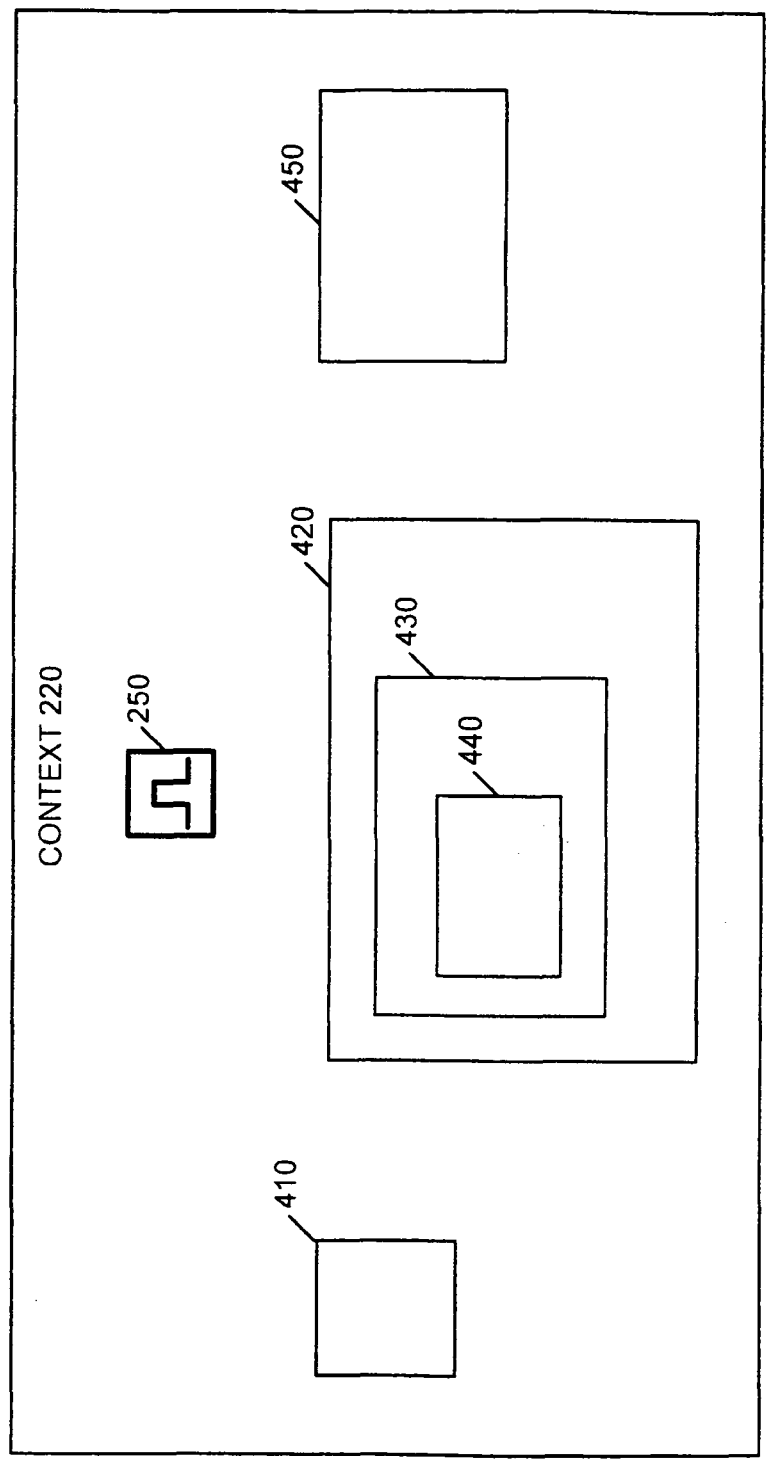
FIG. 4A illustrates an exemplary arrangement that includes a block and contexts in a graphical model.

FIG. 4A illustrates an exemplary arrangement of contexts within a graphical model. Context 220 (FIG. 4A) may include individual blocks or may include groupings of blocks. For example, context 220 may include block 410, and sub-contexts 420, 430, 440, and 450. In an embodiment, blocks and sub-contexts may be arranged in hierarchies that can be displayed to a user and/or that can be used to facilitate execution of a graphical model. For example, sub-context 420 may further include sub-context 430 and a sub-context 440, where sub-context 440 resides within sub-context 430. In FIG. 4A, context 420 may act as a parent context to sub-context 430 and as a grandparent context to sub-context 440. Context 220 may also include sub-context 450, where sub-context 450 may include a number of blocks, some or all of which can be resettable blocks.

Referring to FIG. 4B, context 220, block 410, and sub-contexts 420, 430, 440 and 450 may be represented in a hierarchy. For example, block 410 may be shown in a child relationship to context 220 as shown in the leftmost portion of FIG. 4B. In the center portion of FIG. 4B, sub-context 420 may be shown as a child of context 220; sub-context 430 as a grandchild of context 220; and sub-context 440 as a great grandchild of context 220. In the rightmost portion of FIG. 4B, sub-context 450 may be represented as a child of context 220.

Exemplary Implicit Reset Configurations

Figure 5:
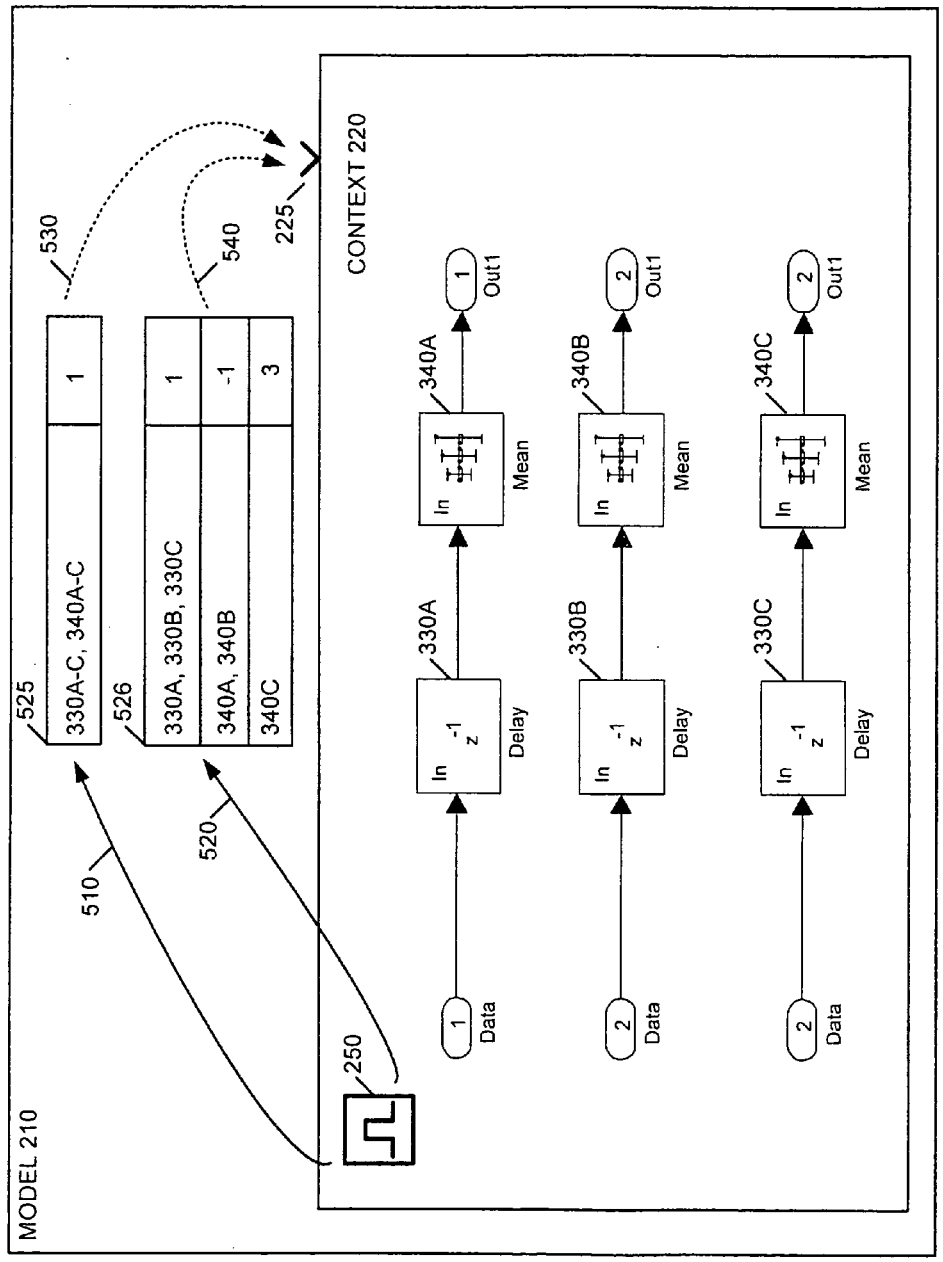
FIG. 5 illustrates an exemplary embodiment that includes reset values that can be used with a context.

FIG. 5 illustrates an exemplary embodiment that includes reset values that can be used with a context. In FIG. 5, context 220 may include blocks having state, such as delay blocks 330 and mean blocks 340. In context 220, blocks having state may be implicitly reset, such that direct reset connections (e.g., reset lines) are not used. For example, reset icon 250 may be associated with one or more reset values that can be used in context 220. In the embodiment of FIG. 5, reset icon 250 may include reference 510 and reference 520 that can refer to reset data structure 525 or 526. References 510, 520 may be identifiers that are used to identify and/or access information, such as information stored in reset data structures 525, 526. For example, references 510, 520 may include links, pointers, addresses, or other types of identifiers.

In FIG. 5, reference 510 may identify reset data structure 525 that can include reset values for delay blocks 330A-C and for running mean blocks 340A-C. By way of example, a user may view a model that includes context 220 and reset icon 250. The user may desire to reset context 220 to, for example, an initial state. The user may select reset icon 250 using a pointing device (e.g., a mouse) and reference 510 may be used to access reset data structure 525. Reset values stored in reset data structure 525 may be implicitly applied to context 220 via logical path 530. For example, a reset value of 1 for blocks 330A-C and for blocks 340A-C may be read from reset data structure 525 and applied to context 220, such that states for blocks 330A-C and for blocks 340A-C are reset to 1. In an embodiment, states for delay blocks 330 and mean blocks 340 can be reset while model 210 is executing.

Still referring to FIG. 5 and using another example, a programmatic instruction may select reset icon 250. Reset icon 250 may access reset data structure 526 via reference 520. Reset values stored in reset data structure 526 may be applied to resettable blocks in context 220 while model 210 executes. For example, states for blocks 330A-C may be reset to a value of 1, states for blocks 340A and 340B may be reset to a value of −1 and a state for block 340C may be reset to a value of 3. Reset values from reset data structure 526 may be communicated to context 220 via logical path 540.

Exemplary embodiments, such as those shown in FIG. 5, can apply reset values to one or more contexts as a model executes, thus allowing states within the context to be reset without increasing model execution time because the contexts do not have to be paused/stopped. Exemplary embodiments may further apply resets to one or more levels in a hierarchy of contexts. For example, one embodiment may apply a reset only to a topmost level of a hierarchy of contexts, while another embodiment may apply a reset to the topmost level of the hierarchy and to a portion of the levels below the topmost level. Another embodiment may apply a reset to all levels in a hierarchy of contexts. And still another embodiment may apply a reset to intermediate levels of a hierarchy and/or may perform resets to contexts based on logical operations performed with respect to contexts (e.g., logical OR, AND, etc., operations performed between two or more contexts).

Figure 6:
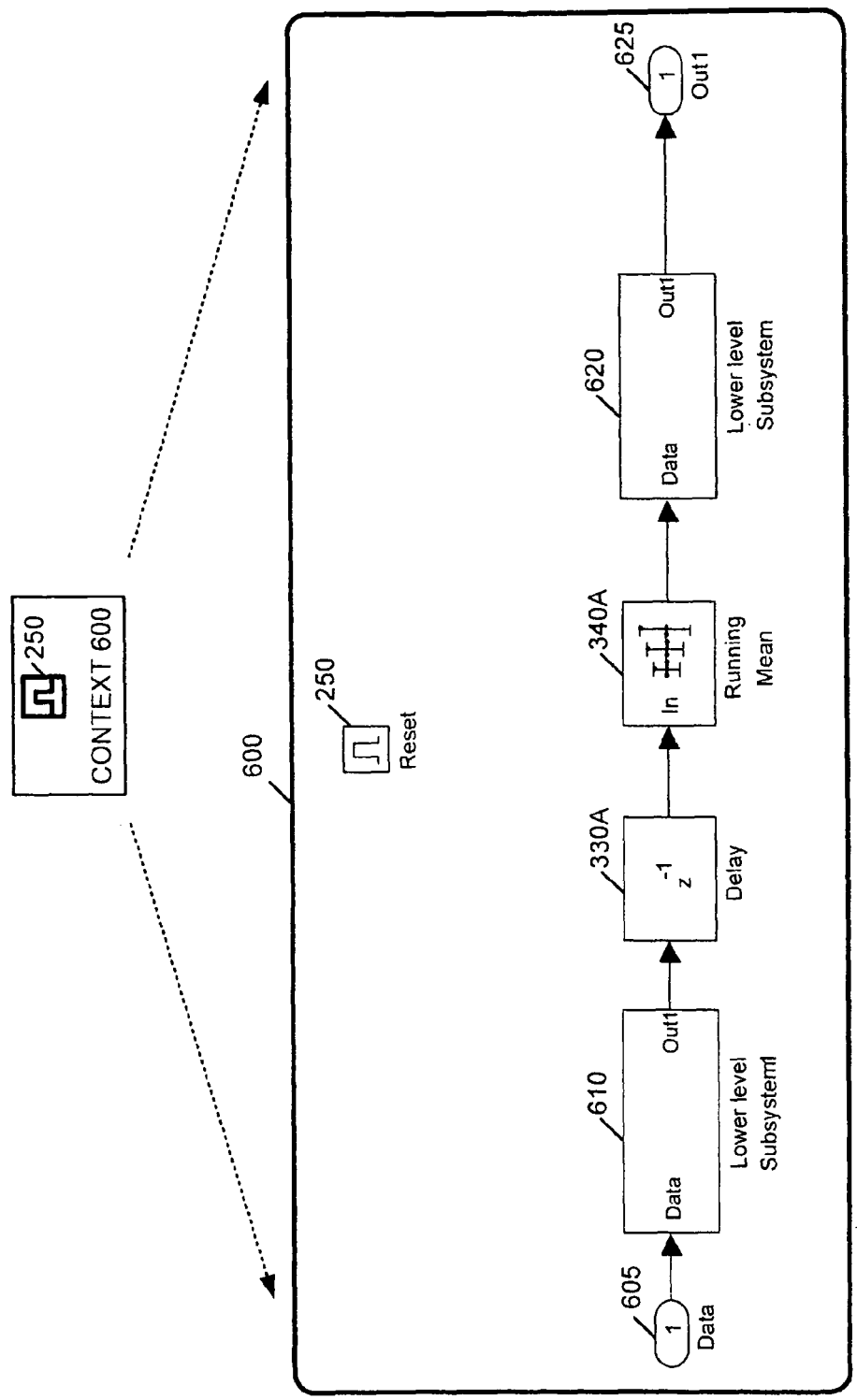
FIG. 6 illustrates an exemplary embodiment that can perform resets at multiple levels of a graphical model.

FIG. 6 illustrates an exemplary embodiment that can perform resets at multiple levels with a graphical model. In FIG. 6, context 600 may include delay block 330A, running mean block 340A, data input 605, lower level subsystem 610 and 620, and data output 625. Data input 605 may provide data values to other blocks in context 600, such as subsystems 610 and 620 or blocks 330A and 340A. Data output 625 may receive data values from subsystems 610, 620 or blocks 330A, 340A and may store the received data values in a storage device. In another embodiment, data output 625 may send data values to a destination, such as a remote device.

A user may select reset icon 250 or a programmatically generated instruction may select reset icon 250. When reset icon 250 is selected, a reset activity may be applied to all resettable blocks at a given level, or layer, of a hierarchy and to all levels below the given level. For example, subsystems 610, 620 and blocks 330A, 340A may all reside on a level of a hierarchy. Subsystems 610, 620 may include other blocks, not shown in FIG. 6, that may be considered as residing in a level that is below (e.g., a child) the level on which subsystems 610, 620 reside. When the reset signal is applied to context 600, states within blocks 330A, 340A are reset, and states within all levels of subsystems 610, 620 are reset. For example, the states for blocks 330A, 340A and for subsystems 610, 620 can be reset to an initial value (e.g., a starting value) while a model that includes context 600 executes.

Figure 7:
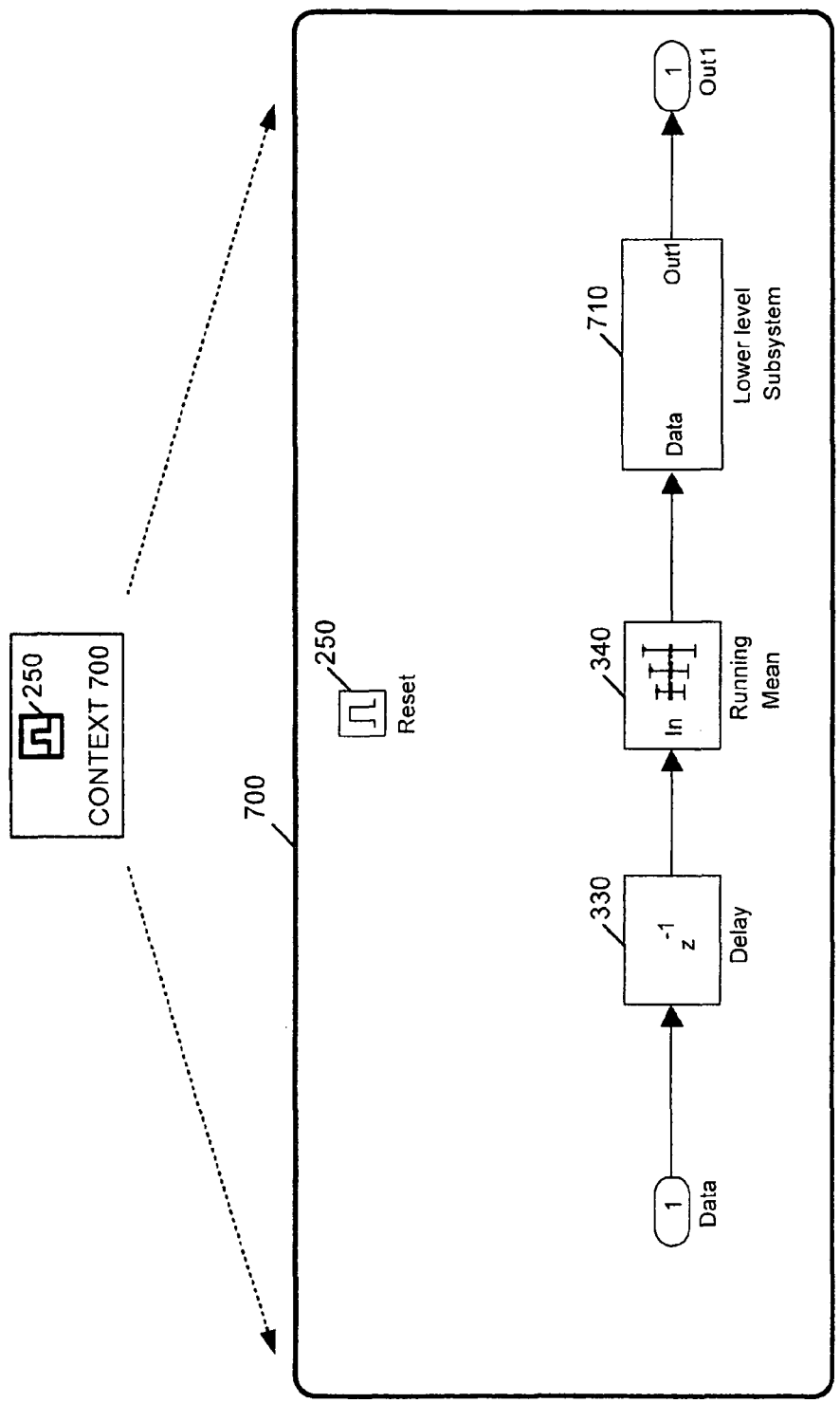
FIG. 7 illustrates an exemplary embodiment that can perform resets at a single level of a graphical model.

FIG. 7 illustrates an exemplary embodiment that can perform resets to a single level of a graphical model. The embodiment of FIG. 7 is configured to apply implicit resets to only resettable blocks and subsystems at a certain level of a hierarchy. For example, subsystem 710 may have a first level that is at a level on which blocks 330A and 340A reside. Subsystem 710 may further have blocks and/or subsystems associated with it (not shown in FIG. 7) that reside on levels that are below the level on which blocks 330A, 340A reside. When an implicit reset is applied to context 700, states associated with blocks 330A, 340A and with the topmost level of subsystem 710 may be reset; however, states associated with levels below the topmost level of subsystem 710 may not be reset.

Exemplary embodiments allow a user or a programmatic instruction to determine which resettable blocks, subsystems, sub-contexts, etc., in a hierarchy of contexts are reset while a model executes.

Exemplary Architecture

Figure 8:
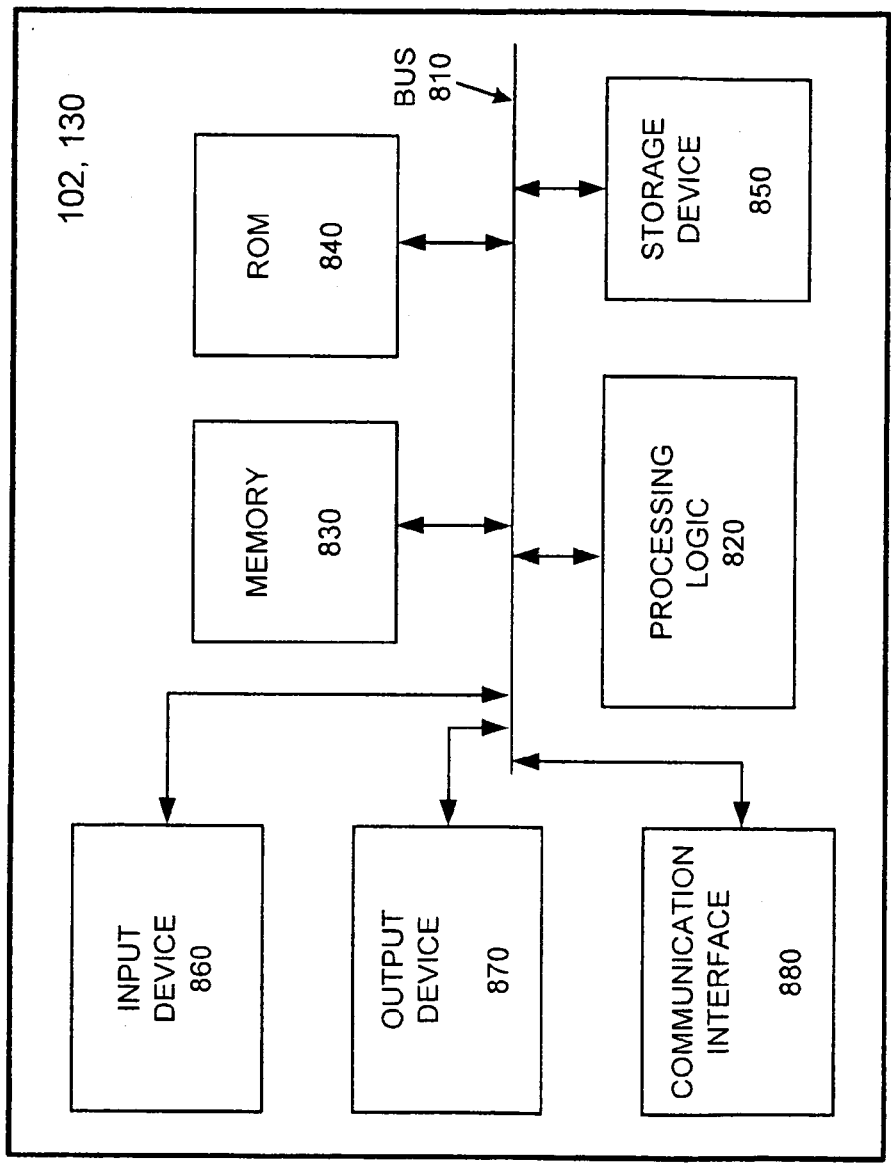
FIG. 8 illustrates an exemplary architecture that can be used to implement a computing device that can be used to implement exemplary embodiments described herein.

FIG. 8 illustrates an exemplary computer architecture that can be used to implement computer 102 or server 130 of FIG. 1A. FIG. 8 is an exemplary diagram of an entity corresponding to computer 102 and/or server 130. As illustrated, the entity may include a bus 810, processing logic 820, a main memory 830, a read-only memory (ROM) 840, a storage device 850, an input device 860, an output device 870, and/or a communication interface 880. Bus 810 may include a path that permits communication among the components of the entity.

Processing logic 820 may include a processor, microprocessor, or other types of processing logic that may interpret and execute instructions. In one implementation, processing logic 820 may include a single core processor or a multi-core processor. In another implementation, processing logic 820 may include a single processing device or a group of processing devices, such as a processor cluster or computing grid. In still another implementation, processing logic 820 may include multiple processors that may be local or remote with respect each other, and may use one or more threads while processing.

Main memory 830 may include a random access memory (RAM) or another type of dynamic storage device that may store information and instructions for execution by processing logic 820. ROM 840 may include a ROM device or another type of static storage device that may store static information and/or instructions for use by processing logic 820. Storage device 850 may include a magnetic, solid state and/or optical recording medium and its corresponding drive, or another type of static storage device that may store static information and/or instructions for use by processing logic 820.

Input device 860 may include logic that permits an operator to input information to the entity, such as a keyboard, a mouse, a pen, a touchpad, an accelerometer, a microphone, voice recognition, camera, neural interface, biometric mechanisms, etc. Output device 870 may include a mechanism that outputs information to the operator, including a display, a printer, a speaker, etc. Communication interface 880 may include any transceiver-like logic that enables the entity to communicate with other devices and/or systems. For example, communication interface 880 may include mechanisms for communicating with another device or system via a network.

The entity depicted in FIG. 8 may perform certain operations in response to processing logic 820 executing software instructions contained in a computer-readable medium, such as main memory 830. A computer-readable medium may be defined as a physical or logical memory device. The software instructions may be read into main memory 830 from another computer-readable storage medium, such as storage device 850, or from another device via communication interface 880. The software instructions contained in main memory 830 may cause processing logic 820 to perform processes described herein when the software instructions are executed on processing logic. Alternatively, hardwired circuitry may be used in place of or in combination with software instructions to implement processes described herein. Thus, implementations described herein are not limited to any specific combination of hardware circuitry and software.

Although FIG. 8 shows exemplary components of the entity, in other implementations, the entity may contain fewer, different, or additional components than depicted in FIG. 8. In still other implementations, one or more components of the entity may perform one or more tasks described as being performed by one or more other components of the entity.

Exemplary User Interfaces

Figure 9A:
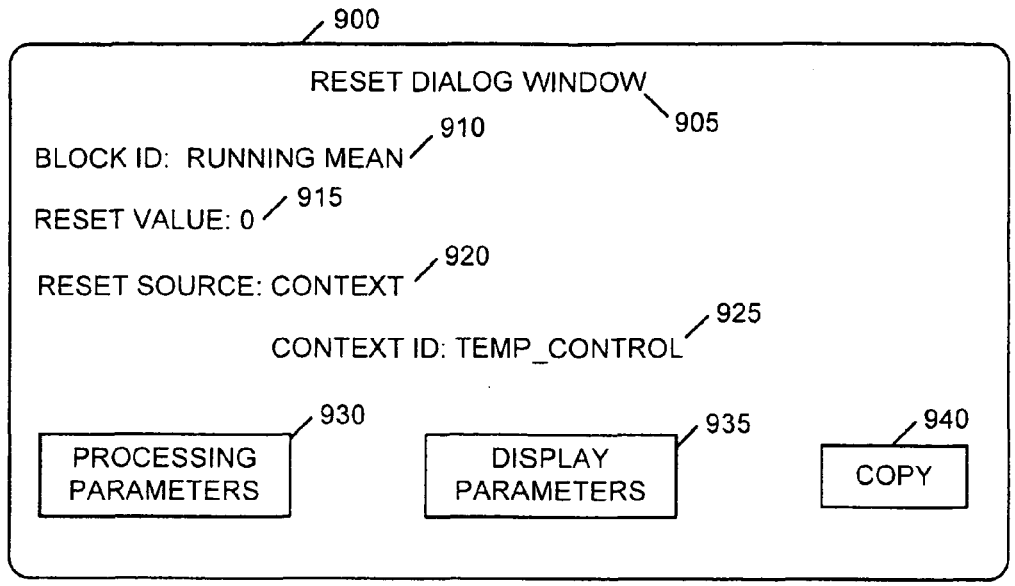
FIGS. 9A and 9B illustrate exemplary user interfaces for interacting with an embodiment.
Figure 9B:
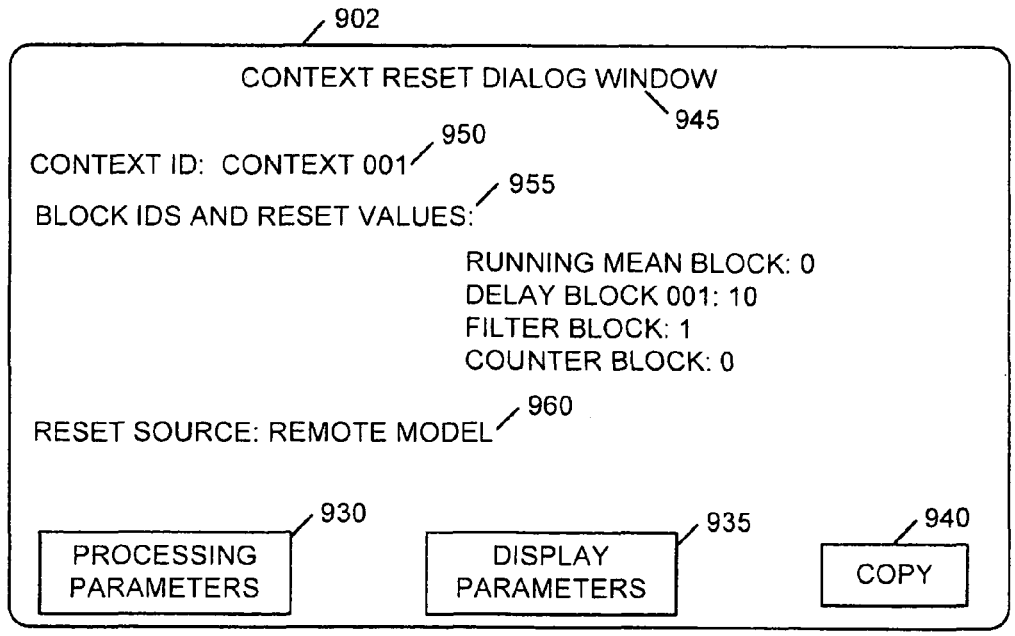

FIGS. 9A and 9B illustrate exemplary user interfaces for interacting with an embodiment. In an embodiment, dialog windows may be used to allow a user to interact with models that include implicitly reset blocks and/or contexts.

FIG. 9A illustrates a dialog window 900 that can be used to configure a block having a state that can be implicitly reset. Dialog window 900 may include a window title 905 that identifies the dialog window for a user. Dialog window 900 may also include a block identifier field 910 that can be used to identify a block that will be implicitly reset. A reset value 915 may be displayed for a block identified in block identifier field 910. A user may enter reset values directly, e.g., by entering a numerical value, or indirectly, e.g., by entering a link, path name, etc., where the link or path name is associated with one or more reset values that are used by the block.

Dialog window 900 may also include reset source 920 that identifies a source that provides the implicit reset value to the block identified in block identifier field 910. In an embodiment, when a user identifies a context as the source for the implicit reset value, the user may be provided with a context identifier field 925 that allows the user to specify a context that provides the implicit reset signal.

Dialog window 900 may further include other logic that allows a user to further configure a block that can be implicitly reset. For example, processing parameters button 930 may be selected using a pointing device. When selected, processing parameters button 930 may allow a user to configure processing parameters for the block, such as sample rate, threshold values, buffer sizes, etc. Display parameters button 935 may allow the user to select display parameters for a block. For example, the user may select a color for the block, a font size for the block, etc. Copy button 940 may allow a user to copy a block and information for the block, such as information entered by the user into dialog window 900.

FIG. 9B illustrates a dialog window 902 that can be used to configure a context that can be implicitly reset in a model. Dialog window 902 may include a title 945 that identifies dialog window 902 for a user. Dialog window 902 may include a context identifier field 950 that identifies a context that can be implicitly reset. When a user specifies a context, the user may be provided with block configuration field 955. In an embodiment, block configuration field 955 may identify blocks within a context that include state. Block configuration field 955 may allow a user to specify an implicit reset value for resettable blocks identified under block configuration field 955.

Dialog window 902 may also include reset source field 960 that allows a user to specify a source that provides an implicit reset value to the context identified in context identifier field 950.

In an embodiment, dialog window 902 may include processing parameters button 930, display parameters 935, and copy button 940. In this embodiment, processing parameters button 930, display parameters 935, and copy button 940 may apply to the context identified in context identifier field 950 or to resettable blocks identified in block configuration field 955.

Exemplary Processing

Figure 10:
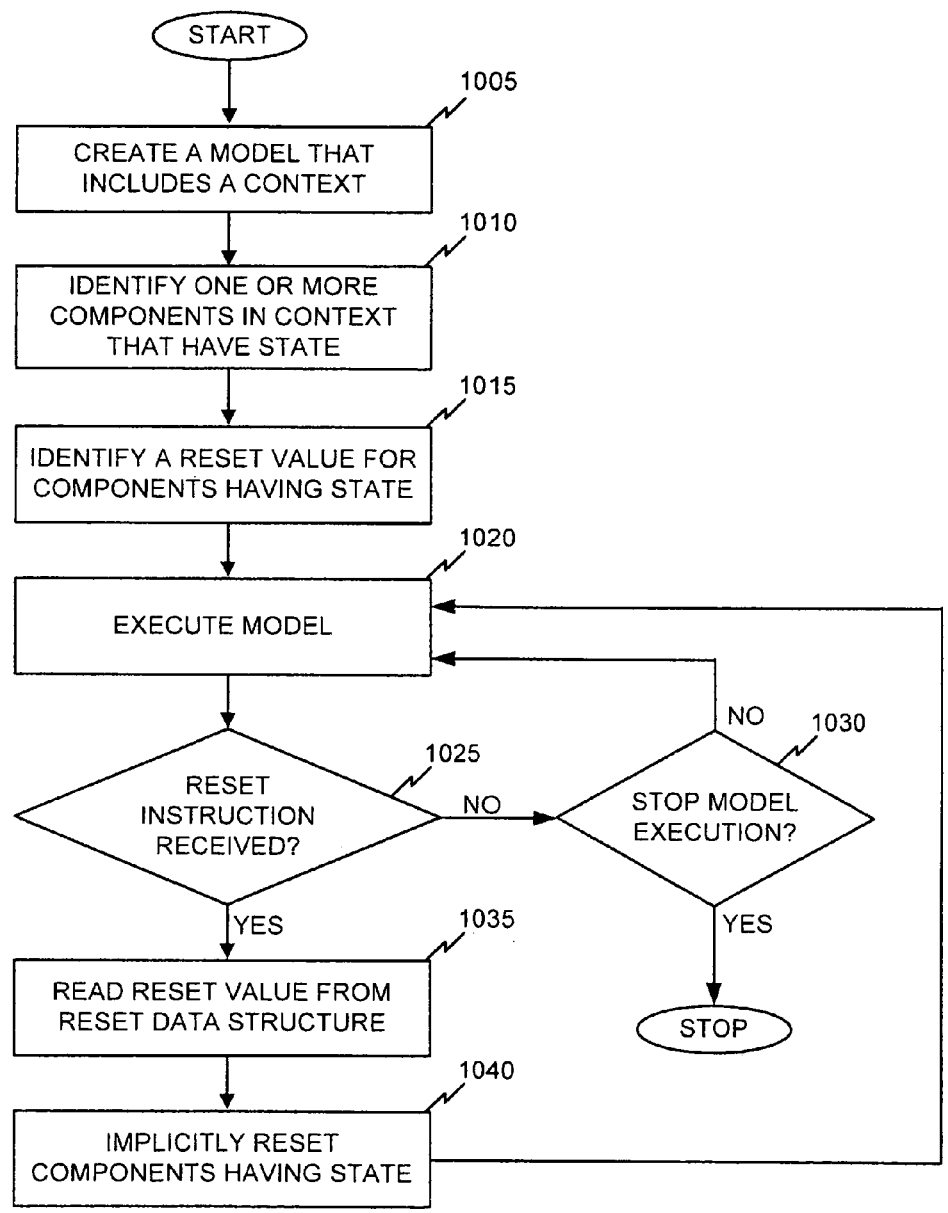
FIG. 10 illustrates exemplary processing that can be used to practice an embodiment.

FIG. 10 illustrates exemplary processing that can be used to practice an exemplary embodiment. A graphical model of a physical system may be created, where the model includes one or more contexts (act 1005). For example, model 210 may be created and may contain context 220. One or more components having state and residing in context 220 may be identified (act 1010). For example, delay block 330A and/or mean block 340A may be identified since these blocks include a state. In an embodiment, a user may identify components having state or programmatic instructions produced by a device may identify components having state.

One or more reset values can be identified for blocks residing in context 220 and having a state (act 1015). For example, reset data structure 526 (FIG. 5) can be populated with a reset value of 1 for delay block 330A and with a reset value of −1 for mean block 340A. In an embodiment, a user may interact with a graphical user interface (GUI) to populate reset data structure 526.

Model 210 may be executed (act 1020). In an embodiment, a user may initiate execution of model 210. For example, the user may select a "run" button using a pointing device. In another embodiment, a programmatic instruction generated by a device may be used to initiate execution of model 210. When model 210 executes, one or more contexts (e.g., context 220) may execute. For example, context 220 may have an activation status associated therewith. When context 220 is executed, the activation status may switch, for example, from an off status to an on status.

As model 210 executes, model 210 may determine whether a reset instruction is received (act 1025). For example, a user may select reset icon 250 and model 210 may determine that the user has made the selection. When model 210 determines that the user has made a selection, model 210 may read reset values from reset data structure 526 while context 220 continues to execute (e.g., continues to compute output and new state values) (act 1035). For example, model 210 may use reference 520 to access storage locations in reset data structure 526. Model 210 may provide accessed reset values to context 220 implicitly using logical path 540. Context 210 may continue to execute using the accessed reset values without, for example, enabling or disabling portions of context 210 (e.g., blocks, sub-contexts, etc.) that are reset.

Model 210 may allow context 220 to implicitly reset while context 220 is executing (act 1040). For example, context 220 may implicitly reset while the activation status for context 220 remains on. In an embodiment, context 220 may apply a reset value of 1 to delay block 330A and may apply a reset value of −1 to mean block 340A. Delay block 330A may reset its state value to 1 when the reset value is received, and mean block 340A may reset its state value to −1 when the reset value is received. In another embodiment, block 330A and 340A may reset their state values at a determined time (e.g., a certain number of milliseconds) after receiving their respective reset values.

Model 210 may generate an execution result when states for delay block 330A and mean block 340A have been reset to 1 and −1, respectively. For example, context 220 may continue executing when states for delay block 330A and mean block 340A are reset and this continued executing may allow context 220 to produce a result that is used by model 210 to produce an execution result. The execution result can be displayed to a user, stored in a storage medium, or sent to a destination.

In an embodiment, model execution may return to act 1020 from act 1040 once components having state have been implicitly reset.

Returning to act 1025 in FIG. 10, when a reset instruction is not received at act 1025, model 210 may determine whether model execution should be stopped (act 1030). If model execution should be stopped, model 210 stops executing. When model 210 stops executing, context 220 may stop executing as well (e.g., an activation status of context 220 may switch from an on status to an off status). In contrast, at act 1030 it may be determined that model execution should not be stopped, when this occurs, processing returns to act 1020 and model 210 continues to execute.

Exemplary embodiments may operate with types of logic that may be internal to model 210 or external to model 210. For example, context 220 may interact with an event handler that may reside on a remote device. Blocks within context 220 that include state may post events to the event handler when the events occur. For example, a block may post a reset event to the event handler. In turn the event handler may cause a different model to perform an operation once the event handler receives the reset event. When the event handler communicates with the different model, the event handler may cause the different model to perform, for example, a power up operation. The power up operation may allow the different model to perform one or more operations while the model is powered on.

Exemplary embodiments may further be configured to operate with dynamic systems. For example, model 210 and/or context 220 may be adapted to support execution structures for a dynamic system. By way of example, an embodiment can be configured to support derivatives, zero crossings, prefire, fire, postfire, output operations for blocks used in dynamic systems, update operations for blocks used in dynamic systems, etc.

Embodiments described herein produce useful and tangible results. For example, tangible results (e.g., results that can be perceived by a human) can be produced when a result is displayed to a user, when a device makes a sound, vibrates, performs an operation (e.g., moves, interacts with a person, etc.), etc. Useful results may include, but are not limited to, storage operations, transmission operations (e.g., sending information or receiving information), display operations, displacement operations, code generating operations, etc. Tangible and/or useful results may include still other activities, operations, etc., without departing from the spirit of the invention.

CONCLUSION

Implementations may provide a modeling environment that allows states to be implicitly reset while a model executes.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 10, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 1A, 1B, or 8 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining the invention.

The scope of the invention is defined by the claims and their equivalents.

What is claimed is:

1. A non-transitory computer-readable medium storing computer-executable instructions that when executed by processing logic interacts with a context in a graphical model, the medium storing one or more instructions for:
    associating a plurality of blocks having state in the graphical model with a context that includes a reset input, the plurality of blocks including a first block, the context:
        including logic that allows states for the plurality of blocks associated with the context to be reset without an explicit reset connection from the graphical model to the context or to the plurality of blocks associated with the context, and
        being located in the graphical model;
    executing the context, the executing storing the state for the first block in memory;
    resetting the state for the first block implicitly when an implicit reset signal is received at the reset input while the context is executing, the resetting occurring without stopping and restarting the model and the first block;
    changing the state for the first block from a first value to a second value while the context executes; and
    executing the context when the state for the first block has the second value without disabling and re-enabling the first block.

2. The medium of claim 1, wherein the changing further comprises:
    one or more instructions for obtaining the second value from:
        a line, or
        a user interface.

3. The medium of claim 1, further comprising one or more instructions for:
    associating a second block with the graphical model,
    the second block located outside the context,
    the second block having a second state, and
    the second state having an initial value,
    where the executing of the context when the first state has the second value further comprises one or more instructions for:
        maintaining the second state at the initial value.

4. The medium of claim 1, further comprising one or more instructions for:
    associating a second block with the context, the second block not having a state.

5. The medium of claim 1, further comprising one or more instructions for:
    interacting with a second context that is in a second graphical model, the second context having a second context state that has an initial value;
    resetting the second context state implicitly when the graphical model is executing, the resetting of the second context state changing the initial value of the second context state to a new value; and
    executing the second graphical model when the second context state is set to the new value.

6. The medium of claim 1, further comprising one or more instructions for:
    setting the state for the first block to an initial value prior to the executing of the context.

7. The medium of claim 6, wherein the setting further comprises one or more instructions for:
    obtaining the initial value from one or more of:
        a user input device,
        a dialog interface,
        a line,
        a block,
        a subsystem,
        a model,
        a link, and
        a storage location.

8. The medium of claim 1, further comprising one or more instructions for:
    generating code from the graphical model, the generated code for implementing the graphical model.

9. The medium of claim 8, wherein the generated code is source code.

10. The medium of claim 8, further comprising one or more instructions for:
    sending the generated code to a destination, the destination performing an operation when the generated code is executed on the destination.

11. The medium of claim 1, further comprising one or more instructions for:
    accessing generated code that implements the graphical model; and
    executing the generated code, the executing implementing the graphical model on a destination device.

12. The medium of claim 11, wherein the destination device comprises:
    a field programmable gate array;
    a digital signal processor;
    an application specific integrated circuit
    a graphics processing unit; or
    a target hardware platform.

13. A non-transitory computer-readable medium storing computer-executable instructions that when executed by processing logic implicitly changes the value of a state in a graphical model while the model executes, the medium storing one or more instructions for:
    identifying a context that includes a first block having a state, the context:
        including logic that allows the state to be reset without an explicit connection from the graphical model to the context or to the first block, and
        being located in the graphical model;
    executing the context when the state has a first value, the executing storing the state in memory;
    resetting, implicitly, the state from the first value to a second value based on a user input, the resetting occurring:
    while the context is executing without starting or stopping the graphical model and the first block; and
    executing the context when the state has the second value without stopping and restarting the first block having the state.

14. The medium of claim 13, wherein the changing further comprises one or more instructions for:
    obtaining the second value from:
        an input device,
        a line,
        a dialog interface,
        a link,
        a model,
        a subsystem,
        a block, or
        a storage location.

15. The medium of claim 13, further comprising one or more instructions for:
    identifying a second block located outside the context, the second block having a second state that has an initial value, and;
    where the executing of the context when the state has the second value further comprises one or more instructions for:
        maintaining the second state at the initial value.

16. The medium of claim 13, further comprising one or more instructions for:
    associating a second block with the context, the second block not having a state.

17. The medium of claim 13, further comprising one or more instructions for:
    interacting with a second context that is in a second graphical model, the second context having a second context state that has an initial value;
    resetting the second context state implicitly when the context is executing, the resetting of the second context state changing the initial value of the second context state to a new value; and
    executing the second graphical model when the second context state is set to the new value.

18. The medium of claim 13, wherein the first value is an initial value.

19. A device, comprising:
    a memory to:
        store a model, the model including:
            a context that:
                is associated with a plurality of blocks,
                includes logic that allows a state of a block in the context to be reset without an explicit connection from the graphical model to the context or to a first block associated with the context,
                is in the graphical model, and
                implicitly resets a state for the block associated with the context when an implicit signal is received at a reset input of the context, and
            stores the state; and
    processing logic to:
        execute the context,
        process the implicit signal when the implicit signal is received at the reset input and to reset the state implicitly during the executing, the resetting occurring without stopping and restarting the model and the first block,
        change the state from a first value to a second value when:
            the context is executing, and
            the implicit signal is received at the reset input,
        execute the context when the state has the second value without disabling and re-enabling the block having the state, and
        produce the result based on the executing the context when the state has the second value.

20. A method for interacting with a context in a graphical model executing in a computing device, the method comprising:
    associating a plurality of blocks having state in the graphical model with a context that includes a reset input, the plurality of blocks including a first block, the context:
        including logic that allows states for the plurality of blocks associated with the context to be reset without an explicit reset connection from the graphical model to the context or to the plurality of blocks associated with the context, and
        being located in the graphical model;
    executing the context, the executing storing the state for the first block in memory of the computing device;
    resetting the state for the first block implicitly when an implicit reset signal is received at the reset input while the context is executing on the computing device without stopping and restarting the model and the first block;
    changing the state for the first block from a first value to a second value while the context executes on the computing device;
    executing, using the computing device, the context when the state for the first block has the second value without disabling and re-enabling the first block, the executing of the context when the state has the second value producing an execution result; and
    storing the execution result in a storage device.

21. The method of claim 20, further comprising:
generating code based on the executing the context when the state for the first block has the second value; and
wherein the storing further comprises:
storing the generated code in the storage device.

22. The method of claim 20, further comprising:
sending information identifying the state for the first block to an event handler, the event handler associated with a remote model, the event handler further configured to allow the remote model to power on based on the occurrence of an event.

* * * * *

UNITED STATES PATENT AND TRADEMARK OFFICE
CERTIFICATE OF CORRECTION

PATENT NO. : 8,458,655 B1
APPLICATION NO. : 12/276974
DATED : June 4, 2013
INVENTOR(S) : Darel Allen Linebarger et al.

It is certified that error appears in the above-identified patent and that said Letters Patent is hereby corrected as shown below:

Title Page 2, item (56), under Other Publications, at column 2, line 11, in the Buck reference, change "Eigth" to --Eighth--.

Signed and Sealed this
Third Day of September, 2013

Teresa Stanek Rea
*Acting Director of the United States Patent and Trademark Office*